United States Patent [19]

Fuhrman et al.

[11] Patent Number: 4,824,634
[45] Date of Patent: Apr. 25, 1989

[54] ELEMENT WITH BURNABLE POISON COATING

[75] Inventors: Nathan Fuhrman, Plainville; Wlliam J. Bryan, Granby, both of Conn.

[73] Assignee: Combustion Engineering, Inc., Windsor, Conn.

[21] Appl. No.: 81,969

[22] Filed: Aug. 5, 1987

[51] Int. Cl.⁴ ................................................ G21C 3/00
[52] U.S. Cl. ..................................................... 376/419
[58] Field of Search .......................................... 376/419

[56] References Cited

U.S. PATENT DOCUMENTS 3,625,821  12/1971  Ricks ................................ 376/419
4,541,984   9/1985  Palmer .............................. 376/415

Primary Examiner—Donald P. Walsh
Attorney, Agent, or Firm—John H. Mulholland

[57] ABSTRACT

A fuel element for a nuclear reactor having a zirconium-tin alloy cladding tube, with a thin coating of particles of enriched boron-containing compound burnable poison particles, such as $ZrB_2$ deposited from a liquid suspension which includes an acrylic polymer binder material and isopropanol. Graphite lubricant particles can be included in the coating.

7 Claims, 2 Drawing Sheets

ELEMENT WITH BURNABLE POISON COATING

BACKGROUND OF THE INVENTION

This invention relates to nuclear fuel elements and in particular, the provisions of fuel elements with a burnable poison coating in the form of a thin layer of boron-containing compound particles on the inside of a cladding tube. The burnable poison particles are deposited alone or with lubricity providing graphite particles from a liquid suspension on the inside of a zirconium-alloy cladding tube.

A nuclear fuel element of the type involved in the invention is part of a fuel assembly. Heretofore, typical fuel assembly designs have employed fixed lattice burnable poison rods to control early-in-life reactivity and power peaking. These rods have become a necessary design feature for the fuel management of first cores of light water reactors as well as in schemes to achieve extended burnups and reduced radial neutron leakage. Such rods displace fuel rods within the assembly lattice which increases the core average linear heat generation rate and local peaking factors. Alternate approaches have been proposed that place burnable poison material inside the fuel rods so that much less fuel material is displaced, for example, as boride coatings on the $UO_2$ pellets. Such coatings, however, while adhering when first applied, tend to spall off under the stresses of the irradiation environment in the nuclear reactor core, in part because of difficulty in matching the thermal expansion behavior of the coating to that of the fission material or $UO_2$ pellet. Attempts to incorporate boron compounds as mixtures within the $UO_2$ pellets have not been successful because of volatilization of boron species during high temperature fabrication processes and redistribution of the boron under irradiation.

For further background, see U.S. Pat. Nos. 3,925,151; 4,372,817; 4,560,575; 4,566,989; 4,582,676; 4,587,087; 4,587,088; and 4,636,404.

SUMMARY OF THE INVENTION

The invention involves an improved fuel element with a burnable poison coating which substantially overcomes problems of spalling and coating integrity because of the closely matched thermal expansion coefficients of the substrate and coating material and the action of fission sintering to enhance adhesion of the coating to the substrate.

The invention includes coating a thin layer of a boron-containing compound on the inside surface of the zirconium alloy cladding tube of the fuel rod. The preferred boron-containing compound is zirconium diboride ($ZrB_2$) because its thermal expansion coefficient most nearly matches that of the zirconium-tin alloy cladding tube. The adhesion between the coating and cladding, therefore, is less likely to deteriorate under irradiation than would similar coatings on the $UO_2$ pellets. Also, the fission sintering phenomenon that has been observed in irradiated compacts of boron-containing compound powders at cladding temperatures (approximately 400° C.) is more likely to promote adhesion between the $ZrB_2$ and the metallurgically-related zirconium-tin alloy cladding tube substrate than would be the case for a $UO_2$ substrate. That is, fission sintering will not only join $ZrB_2$ particles to each other, but is also likely to form a bond of the particles to the zirconium-tin alloy substrate under irradiation.

A suitable thin layer or coating of $ZrB_2$ particles on the inside surface of the cladding tube is applied by a method analagous to that used for graphite lubricant coatings developed by the laboratories of the assignee of the instant invention for nuclear fuel rod cladding.

A liquid suspension which includes isopropanol, an acrylic polymer binder material and the boron-containing compound particles in a range of from 0.1 to 1.5 microns, with or without colloidal graphite particles, has its solids content adjusted to provide the desired viscosity for the coating process (approximately 16% by weight solids). Each fuel tube is then filled with the liquid suspension and drained at a controlled rate, leaving a thin film on the inside surface of the cladding tube. The film is dried at room temperature and cured in a vacuum at temperatures up to 427° C. (800° F.). The resulting thin layer containing $ZrB_2$ (and perhaps graphite) at a density of approximately 50% of theoretical, along with a small residue from the decomposition of the binding material. The $ZrB_2$ is preferably initially enriched in the $B^{10}$ isotope to an 80% level.

DETAILED DESCRIPTION

Figure 1:
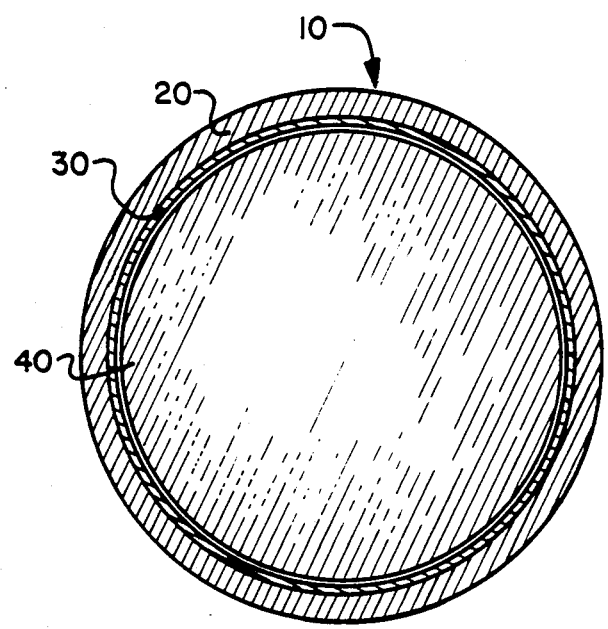
FIG. 1 is a cross-sectional view of a fuel element with a burnable poison coating made according to the principles of the invention.

The numeral 10 generally indicates a fuel element constructor according to the principles of the invention for use in a nuclear reactor. The fuel element includes a zirconium-tin alloy cladding tube 20, a boron-containing compound coating 30 on the inside of the zirconium-tin alloy cladding tube and pellets 40 of fissionable materials such as $UO_2$. The coating 30 of boron-containing compound particles may also include graphite particles. The deposited particles range in size below 1.5 microns in a distribution in which 20% of the particles are of a size greater than 1 micron, and 80% of the particles are of the size less than 1 micron. The coating on the inside of the cladding tube also includes residual acrylic polymer binding material even though most of the acrylic binder material decomposes during the curing operation in a manner to be explained hereinafter.

The assignee of the present invention, Combustion Engineering, Inc., Windsor, Conn. 06095, has previously utilized a product of the Acheson Colloids, a division of Acheson Industries, Inc., Port Huron, Mich. 48060, to supply a graphite lubricating coating on the inside of the zirconium alloy cladding tubes of its fuel elements. The product for coating graphite is designated by Acheson Industries, Inc. as DAG-154 and it is called a fast drying dry film graphite lubricant. DAG-154 air dries rapidly at room temperature and adheres tenaciously to most substrates with minimum surface preparation. A thin coating can be obtained coupled with high lubricity even when supplied by standard spray brush and dip techniques. It is a stable compound of resin-bonded processed micron-graphite in isopropanol to bind the material as a thermoplastic resin and a fluid component in the form of isopropanol is included. Its service temperature is 204° C. (400° F.) with capability of withstanding intermittent temperature of 454° C. (850° F.). The acrylic polymer thermoplastic resin binder material is present to prevent initial rub-off but slowly decomposes above 93° C. (200° F.) during use. It has been used to lubricate mechanisms and as a thread lubricant and as mentioned before by the present assignee to facilitate the insertion of $UO_2$ pellets in cladding tube of nuclear fuel elements. DAG-154 normally has a solids content of 20%.

The invention involves the use of a DAG-154 analog which is similar to DAG-154, except that $ZrB_2$ replaces the graphite pigment, or at least the majority of the graphite pigment. The analog is therefore a liquid suspension which is close physically to a colloidal dispersion of $ZrB_2$. It contains $ZNB_2$ solids emulsified in a isopropanol vehicle with an acrylic polymer added to act as a binding agent for the $ZrB_2$ film after curing. The solution contains $ZrB_2$ pigment with a solids content of 16% by weight typically, but this is adjusted to obtain the desired viscosity. For coating purposes, the pigment $ZrB_2$ may be changed to $B_4C$ or $BN$. Whichever burnable poison particle material is utilized, the boron of the boron-containing compound is enriched to at least an 80% level of $B^{10}$ to give the proper nuclear poison level. Eagle-Picher Industries, Inc., Quapaw, Okla. 74363, enriches the boron by a process of fractional distillation. Boron trifluoride $BF_3$ dimethylether complex is dissociated in a fractional distillation column. $B^{11}F_3$ reassociates more readily so that $B^{11}$ concentrates in the vapor phase and $B^{10}$ concentrates in the liquid phase. Any enrichment of $B^{10}$ can be produced by the Eagle-Picher process.

In performing the invention, the particles enriched to at least an 80% level of $B^{10}$ are ground to sub-micron size. Specifically, the particle size ranges below 1-½ microns and a distribution of 20% of the particles are of a size greater than 1 micron, and 80% of the particles are the size less than 1 micron with the smaller size of this range preferred.

Figure 2:
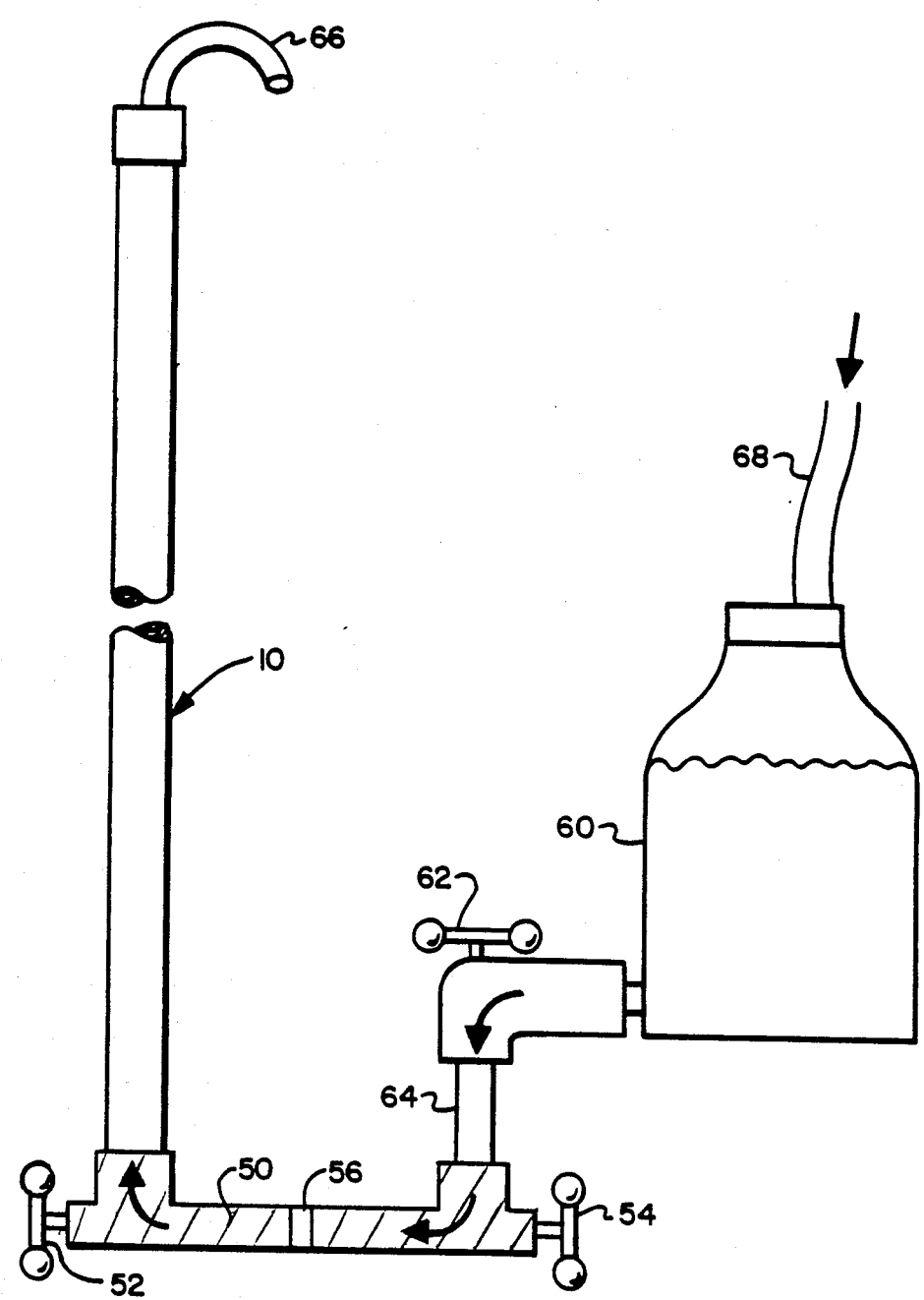
FIG. 2 is a schematic view of the apparatus used for providing the burnable poison coating on the inside of the cladding tube of the fuel element of the invention.

The coating process is illustrated in FIG. 2 and includes a process by which the liquid suspension is pumped upward into the cladding tube 10 while the tube is in the vertical position. The schematic arrangement of FIG. 2 shows that the hollow tube 10 is attached at its lower end by means of a hose and valve connector apparatus 50 having a valve 52 at the lower end of the tube 10 and a valve 54 adjacent its inlet port from a source of the liquid suspension. The connector 50 has a drain 56 between the two valves 52 and 54. A source of the liquid suspension schematically illustrated as a container of liquid 60 has a valve 62 connected by a conduit 64 to the connector 50 through its valve 54. A tube 68 provides a source of high pressure argon or other suitable gas to pressurize the container 60 of the liquid suspension. The over-pressure of argon gas is used to pump the liquid up the tube 10 with the valves 62, 54 and 52 open. Air is exhausted from the tube 10 through an upper vent tube 66. The liquid suspension is held in the tube 10 by means of valve 52 for approximately 1 minute. The liquid is then drained at a controlled rate of approximately 20 feet per minute by manually controlling the valve 52. A rapid drain rate would result in the formation of a very thin $ZrB_2$ coating, whereas the slower drain rate would produce coatings that would be thick and more irregular. During the draining process, warm air (93° C. maximum) is blown down the tube through the vent 66 to accelerate the evaporation of the isopropanol and to prevent axial slumping of the coating. The flow of warm air is maintained for at least 20 minutes following the draining.

The coated tubes 10 are then degassed at room temperature and subsequently cured in a vacuum of $10^{-4}$ to $10^{-6}$ torr at 421° C. (790° F.) for 24 hours. The proposed cure cycle is shown in Tables I & II:

TABLE I

COATING CURE PROCESS

HOLD AT ROOM TEMPERATURE 22° C. (72° F.) AFTER ATTAINING A VACUUM OF $10^{-4}$ TO $10^{-6}$ TORR FOR 2 HOURS MINIMUM.
THERMAL HEAT-UP TO A MAXIMUM OF 432° C. (810° F.) AT A HEATING RATE OF $-12°$ C. (10° F.)/MINUTE WHILE MAINTAINING A VACUUM BETTER THAN $10^{-2}$ TORR.
CURE FOR 24 HOURS AT A TEMPERATURE OF 421° C. (790° F.) $\pm$ 11° C. WHILE MAINTAINING A VACUUM OF $10^{-4}$ TO $10^{-6}$ TORR.
COOL DOWN TO 49°-66° C. UNDER $10^{-4}$ TO $10^{-6}$ TORR VACUUM.

TABLE II

ZIRCONIUM-TIN ALLOYS (% BY WEIGHT)

| | Zircaloy-2 | Zircaloy-4 |
|---|---|---|
| Tin | 1.20 to 1.70 | 1.20 to 1.70 |
| Iron | 0.07 to 0.20 | 0.18 to 0.24 |
| Chromium | 0.05 to 0.15 | 0.07 to 0.13 |
| Nickel | 0.03 to 0.08 | — |
| Niobium (columbium) | — | — |
| Oxygen | A | A |
| Iron + chromium + nickel | 0.18 to 0.38 | — |
| Iron + chromium | — | 0.28 to 0.37 |

The remainder is zirconium and impurities within tolerable amounts.

Care should be taken not to drive off the residual isopropanol too rapidly since this produces microscopic holes and crators in the coatings. For this reason, the coating is initially outgassed at room temperature and then heated slowly to the final cure temperature of 421° C.$\pm$11° C. The cure process completely drives off the isopropanol and causes most of the acrylic binder material to decompose.

The tube 10 is made of a zirconium-tin alloy which is commonly called zircaloy 2 or zircaloy 4. The compositions as zircaloy 2 and zircaloy 4 are shown in Table II, but it should be realized that each will contain some other impurities within tolerance limits known to those skilled in the art. Table II shows the alloying constituents and it should be remembered that the remainder is zirconium and that all ranges are given in percent by weight.

Thus, it will be seen that the invention provides a nuclear fuel element having a burnable coating poison coating in the form of a thin layer of boron-containing compound particles on the inside of the cladding tube in a manner which provides a matched thermal expansion coefficient between the cladding tube substrate and the coating to provide spalling and which provides an adhesion promoting sintering phenomenon from the irradiated environment. The use of these improved elements eliminate the requirement of displacing fuel rods within the assembly lattice and therefore minimizes the fuel material that is displaced in the nuclear reactor core.

We claim:
1. In a fuel element for use in a nuclear reactor which includes a fission material contained within a zirconium-alloy cladding tube, the improvement which comprises:
a coating on the inside of the zirconium-alloy cladding tube, said coating including boron-containing compound burnable poison particles deposited from a liquid suspension which includes an acrylic polymer binder material.

2. The fuel element of claim 1 in which the coating's boron-containing compound includes boron enriched to at least an 80% level of $B^{10}$ to give a desired nuclear poison level for use in the nuclear reactor.

3. The fuel element of claim 1 in which the coating's boron-containing compound includes zirconium diboride.

4. The fuel element of claim 1 in which the zirconium-alloy includes tin in the approximate range of from 1.20 to 1.70.

5. The fuel element of claim 1 in which the particles range in size below 1.5 microns in a distribution in which 20% of the particles are of a size greater than 1 micron and 80% of the particles are of a size less than 1 micron.

6. The fuel element of claim 1 in which the coating includes residual acrylic polymer binder material.

7. The fuel element of claim 1 in which the coating includes particles of graphite as well as particles of a boron-containing compound deposited from the liquid suspension which includes the acrylic polymer binder.

* * * * *